United States Patent [19]

Gault

[11] 3,957,954

[45] May 18, 1976

[54] HIGH-TEMPERATURE REACTION METHOD FOR PRODUCING GROUP II-VI OR A GROUP III-V COMPOUND

[75] Inventor: William Andrew Gault, Ewing Township, Mercer County, N.J.

[73] Assignee: Western Electric Company, Inc., New York, N.Y.

[22] Filed: Oct. 30, 1974

[21] Appl. No.: 519,482

[52] U.S. Cl. .............................. 423/299; 423/509; 423/561; 423/659; 75/134 T
[51] Int. Cl.² .................. C01B 25/00; C01B 19/00; C01B 17/00
[58] Field of Search ........... 423/299, 509, 561, 659; 219/10.41; 75/134 T, 135

[56] References Cited
UNITED STATES PATENTS

| | | | |
|---|---|---|---|
| 2,453,529 | 11/1948 | Mittelmann | 219/10.41 |
| 2,604,666 | 7/1952 | Bosomworth | 219/10.75 |
| 3,338,761 | 8/1967 | Cheney | 423/299 |
| 3,617,371 | 11/1971 | Burmeister | 423/299 |
| 3,704,093 | 11/1972 | Haggerty et al. | 423/561 |

*Primary Examiner*—Oscar R. Vertiz
*Assistant Examiner*—Gregory A. Heller
*Attorney, Agent, or Firm*—J. Rosenstock

[57] ABSTRACT

A high-temperature reaction method is disclosed. The method comprises coupling an inductive heating coil to the contents of a reaction vessel, containing at least one conductive reactant with a coupling efficiency that is different than the coupling efficiency between the coil and the contents of the reaction vessel at the completion of the reaction. An alternating voltage is developed across the coil and the current flowing in the coil is monitored. Typically, the monitored current increases as the reaction proceeds until the reaction is completed whereupon a constant current value is obtained.

6 Claims, 4 Drawing Figures

3,957,954

HIGH-TEMPERATURE REACTION METHOD FOR PRODUCING GROUP II-VI OR A GROUP III-V COMPOUND

BACKGROUND OF THE INVENTION

1. Field of the Invention

This invention relates to a high-temperature reaction method and more particularly, to a method comprising monitoring a current established in an induction heating coil which heats at least one of the reactants.

2. Discussion of the Prior Art

Apparatus and methods of producing a Group II-VI or Group III-V compound, e.g., ZnS, CdS, ZnSe, etc., or GaP, InP, etc., in crystalline form generally have involved high pressures, e.g., 20 to 60 atmospheres, and high temperatures, e.g., about 1,500°C for GaP, due to the high melting point of the Group II-VI or III-V compound, e.g., 1,830°C for ZnS, 1,515°C for ZnSe, 1,475°C for CdS, 1,300°C for ZnTe, about 1,465°C for GaP. These extreme reaction conditions, and the high purities required when the crystalline products are destined for use in fabricating electrical devices such as light emitting diodes, present problems with respect to monitoring the reactions since optical methods cannot be employed with any precision.

A method of avoiding existing problems in these high-pressure, high-temperature reactions is therefore needed and is an object of this invention.

SUMMARY OF THE INVENTION

This invention relates to a high-temperature reaction method, and more particularly, to a method comprising monitoring a current established in an induction heating coil which heats at least one of the reactants.

The method comprises coupling an inductive coil to a conductive reactant, contained in a reaction vessel with at least a second reactant, with a coupling efficiency that is different than the coupling efficiency between the coil and the contents of the reaction vessel at the completion of the reaction. An alternating voltage is applied across the coil to heat at least the conductive reactant. The current supplied to the coil is then monitored to determine the amount of power being supplied to the contents of the reaction vessel.

DETAILED DESCRIPTION

The present invention is one in which an inductive coil is coupled to a reaction site containing a first reactant with a different efficiency from that with which the coil is coupled to the final reaction product formed at the site. In the exemplary, preferred embodiment described hereinafter, the first reactant is gallium, a second reactant is phosphorus and the reaction product is gallium phosphide. However, the inventive concept is equally applicable to any high temperature reaction in which an inductive coil can be coupled to a first reactant at the reaction site with a different efficiency from that with which it is coupled to the reaction product thereat. In particular, the first reactant may be any Group II element or Group III element and the second reactant may be any Group VI or Group V element, respectively, of the Periodic Table of Elements as set forth in the Mendelyev Periodic Table appearing on page B2 in the 45th edition of the "Handbook of Chemistry and Physics," published by the Chemical Rubber Company.

Figure 1:
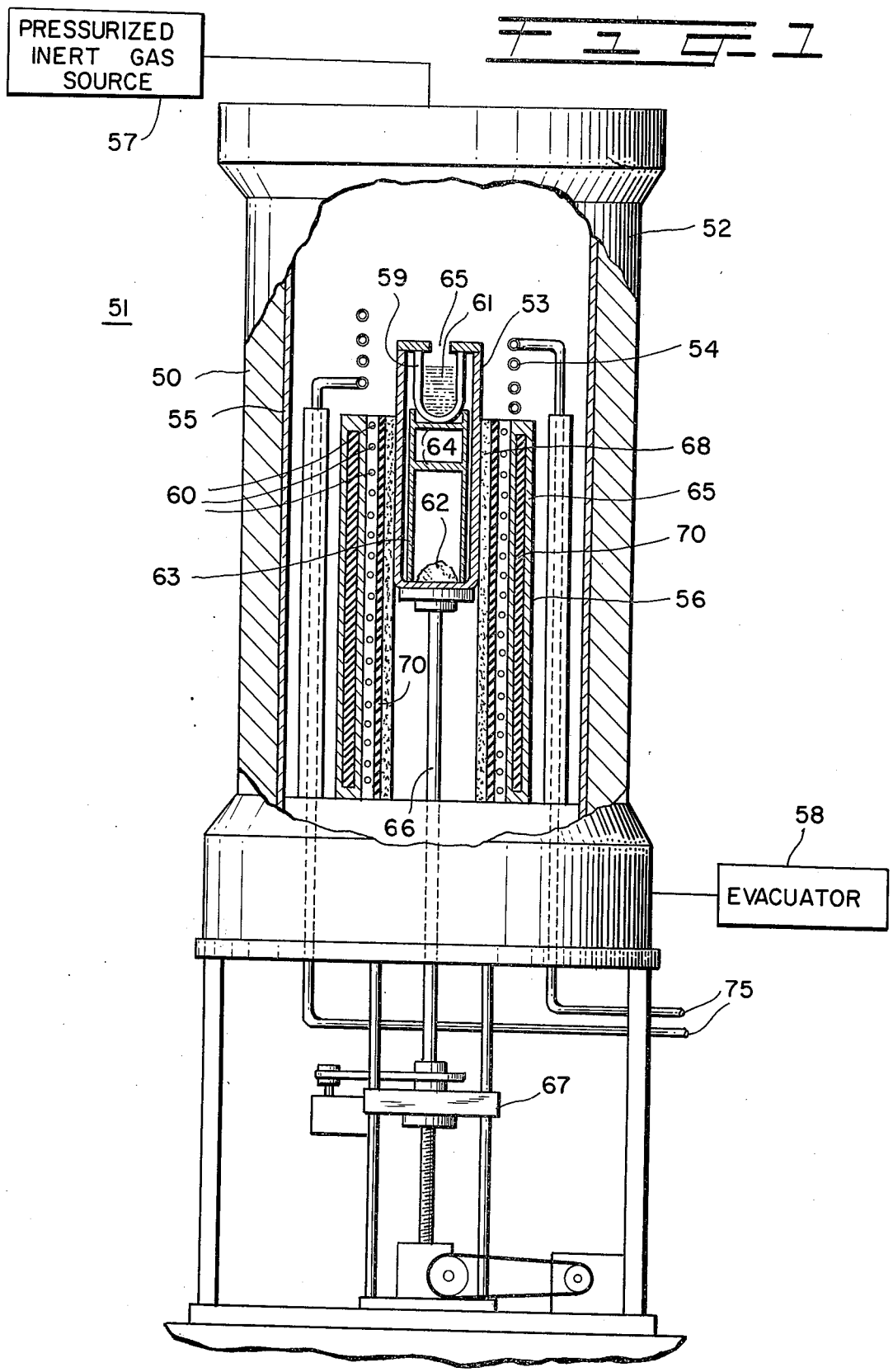
FIG. 1 is a partial isometric view of an apparatus for growing Group II-VI or Group III-V crystals at high pressure and temperature.

The method of this invention is practiced illustratively in the conventional reaction apparatus 51 shown in FIG. 1. The apparatus 51 comprises a high-pressure autoclave 52, typically comprising a high-strength steel sheel 50 with a non-magnetic stainless steel liner 55, which contains a reaction container 53, at least one inductive heating coil 54 and a radiant and/or a conductive heating source 56. Heating source 56 typically comprises a resistance heater having a wound resistance heating wire 60, e.g., an 80 weight percent Ni, 20 weight percent Cr alloy wire, contained within a non-magnetic shell 65. The shell 65 contains electrical insulation 70, in surrounding realtionship to the wire 60. Associated with the heating source 56 is a heating liner 68, e.g., a graphite liner, designed to equalize the transmission of radiant energy between the heating source 56 and the reaction container 53. The reaction apparatus 51 further comprises a source of inert gas 57 and a chamber evacuator 58, both communicating with the interior of the autoclave 52 and being of conventional design.

The reaction chamber 53 contains (1) a refractory container or vessel 59, e.g., a pyrolytic BN container, which houses a first reactant 61, (2) a second reactant 62 and (3) an inert spacer element 63, typically comprising quartz or BN, having baffles 64 separating the two reactants 61,62. The container 53 communicates with the interior of the autoclave 52 via aperature 65. The aperture 65 may be at the end of a capillary tube (not shown), as illustrated in *Journal of the Electrochemical Society: REVIEWS AND NEWS*, February 1970, 41C to 47C, at page 46C. The container 53 is seated on a pedestal 66, e.g., a stainless steel pedestal having a graphite base, and may be raised or lowered by conventional means 67, illustratively a motor-driven, worm-gear assembly.

Figure 2:
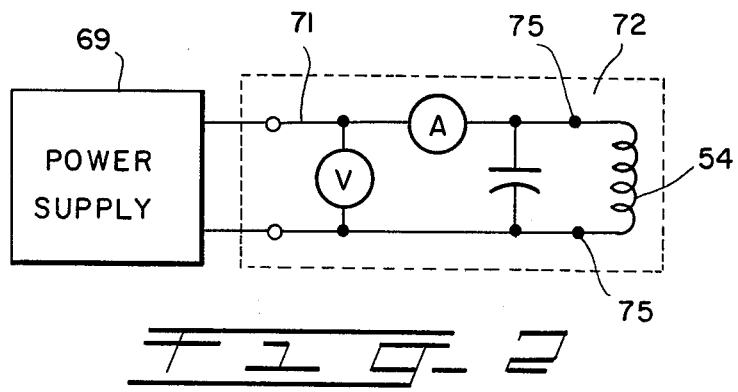
FIG. 2 is a schematic illustration of a typical RF or induction heating heater.

Inductive heating coil 54 is connected at its terminals 75-75 in the induction heating circuit shown in FIG. 2. The induction heating circuit comprises a power supply 69, connecting line 71 and a work or tank circuit 72. The work or tank circuit 72 comprises a capacitor, C, and the work coil 54. For the purposes of the present invention, a voltmeter, V, is employed to provide a measure of the voltage impressed on the working coil 54. Also, an ammeter, A, is used to measure the current supplied to the tank circuit 72 including working coil 54. The power supplied to or absorbed by the reactants 61,62 in the reaction container 53 can therefore be determined. The tank circuit 72 is effective in conjunction with the power supply 69 to transfer energy to the contents of the reaction container 53 in a manner well known in the art.

Referring back to FIG. 1, in operation, according to the invention, the reactants 61,62 are loaded into the autoclave 52, the first reactant 61 being placed in the vessel 59 and the second reactant 62 being placed at the bottom of the reaction container 53. The design of the induction heater, including coil 54, is such that, in a manner to be described hereafter, coupling to the first reactant 61 or load contained in vessel 59 is of a different efficiency, i.e., is either less efficient or more efficient, than when the vessel 59 contains the reaction product at the conclusion of the reaction.

For the purposes of this invention, the term "load" means electrically conductive contents of the reaction container 53 of FIG. 1, which may include the reactants 61,62 and/or the resultant reaction product. Also, for purposes of this invention, the term "coupling" means establishing a desired relationship between the electrical current flowing within induction coil 54 and the current established and flowing within the load.

In the design of the inductive heater, the number of turns (nominally) required for the heating coil 54 is calculated using a conventional technique, typically such as that described in *AIEE Transactions*, Vol. 76, 31–40 (1957). The design of the coil 54 is based upon the diameter and height of the reaction product or final load as well as the electrical resistivity thereof. Optimization of the coupling difference between the initial load (reactant 61) and the final load (reaction product) is then carried out in the following manner. The initial load 61 is placed within the coil 54 and heated at the particular RF power supply voltage employed; the RF heating current is then noted. The final product load or a load simulating the final product is then placed within the coil 54 and heated at the same voltage, and the RF heating current is also noted. The difference between the two currents represents the increase or the decrease in the power delivered to the final load over that delivered to the initial load 61. The increase in current comes about because the coupling between the RF power supply and the coil-final load combination is more efficient than the coupling between the RF power supply and the coil-initial load combination, whereas for the decrease in current the reverse is true. It is desirable to increase this differential in order to achieve greater sensitivity while monitoring the reaction progress. In order to increase the current differential, first, one turn is removed from the calculated coil configuration and the currents required, with the fixed voltage being supplied by the RF power supply, to heat the initial and final loads are obtained. If the new differential has increased over the differential observed for the calculated configuration, then other turns are successively removed and the current differentials are obtained until the configuration showing the greatest differential is found. If upon removing the first turn from the calculated configuration, the new differential is less than the differential observed for the calculated coil configuration, then turns are added to the original coil configuration until the greatest differential is obtained. The coil configuration giving the greatest differential is chosen to provide the most sensitive measure of the reaction progress.

The autoclave 52 is then pressurized to a desired pressure in excess of one atmosphere, e.g., typically 20 to 56 atmospheres in the synthesis of GaP, by introducing the inert pressurized gas, such as argon, nitrogen, from the source 57. Reactant 61 contained in vessel 59 is heated by induction coil 54 to a temperature in excess of the melting point of the desired reaction product, thereby liquifying the elemental reactant 61 contained in the container 59. In order to heat the conductive first reactant 61, referring to FIG. 2, power is supplied from the power supply 69 to impress a constant voltage on the coil 54 thereby creating a current flowing therethrough. The current in the coil 54 produces an alternating magnetic field in the vicinity of the reactant or load 61. The conductive reactant 61, upon exposure to this alternating magnetic field has a current induced therein that heats the conductive reactant 61. As indicated above, instead of initially coupling the coil 54 with the load 61 so that a maximum efficiency is attained, the coil 54 is coupled with the load 61 so that a coupling efficiency is obtained which is different from the coupling efficiency obtained with the contents of the reaction container 53 upon completion of the desired reaction (with a constant voltage applied to the coils). By coupling in this manner, and by applying a constant voltage to the coil 54, the current flowing in the coil 54 will vary until the reaction is completed. Upon completion of the reaction, the current flowing in the coil 54 will become constant. The power supplied to or absorbed by the contents of the reaction container 53, during the desired reaction, can thus be monitored to serve as an indication of the completed formation of the reaction product.

The second reactant 62 is heated by the heating source 56 to a temperature above its volatilization temperature to produce a vapor ambient of the reactant 62 in the reaction chamber 53 which reacts with the reactant 61 to form the reaction product, e.g., GaP.

The respective temperatures of the reactants 61,62 are maintained until a completed reaction occurs between the reactants. In order to ascertain when the reaction is completed the current flowing through the coil 54 is monitored until a constant value is obtained. Referring again to FIG. 2, the current flowing to the coil 54 is measured by means of the ammeter, A, at a fixed voltage measured by the voltmeter, V. Typically, e.g., in synthesizing GaP, the current, having an initial value at a fixed voltage, increases as the reaction proceeds until the reaction between the reactants in the reaction container 53 is completed; whereupon the current flowing through the coil 54 reaches a constant value over a given time interval (usually 10 to 15 minutes). This constant current value represents a completed reaction as for example the complete formation of a reaction product, e.g., GaP.

After the desired reaction has occurred, as evidenced by a constant current flowing in the coils 67, the reaction container 53 is gradually cooled, e.g., by turning off all heating sources, whereby the temperature goes below the melting point of the resultant reaction compound, to deposit a crystalline product. The system, upon cooling, is depressurized, e.g., by a bleed valve (not shown), and the product, which has formed is removed.

EXAMPLE I

A. Apparatus 51 similar to that of FIG. 1 was employed. 750 grams of commercially obtained gallium 61 (99.9999% pure) was placed in a pyrolytic boron nitride crucible 59 which was maintained within a quartz reaction container 53 by means of an alumina pedestal 66. 400 grams of red phosphorus 62, commercially obtained, of highest purity (ca. 99.999% pure) was placed at the bottom of the container 53. The stainless steel autoclave 52 was evacuated by the chamber evacuator 58 to a pressure of about 100 microns. Nitrogen was introduced into the autoclave 52 by the source 57. The autoclave 52 initially had a pressurized nitrogen atmosphere of about 850 psi.

In order to establish a loading whereby the initial coupling efficiency was relatively less than the coupling efficiency between the coil 54 and the final contents of the reaction container 53, the number of turns (nominally) required for the heating coil 54 was calculated employing the conventional technique described in *AIEE Transactions*, Vol. 76, 31–40 (1957). The coil 54 was calculated for 1068 grams of liquid GaP which occupies a volume of about 262 cm$^3$ at a reaction temperature of 1500°C. The calculation required knowledge of the electrical resistivity of liquid GaP at 1500°C which was approximated by the resistivity of liquid gallium metal (27.2 × 10$^{-6}$ ohms-cm). The coil configuration was then fabricated and connected to the tank circuit 72 (FIG. 2).

The coupling differential between the initial load and the final load was then optimized, as described previously. In this optimization, the load of 750g of gallium occupied approximately 128 cm$^3$ and the final load of liquid GaP was approximated by 1540g of liquid gallium. The weight of gallium used in this approximation was determined so that its volume would equal the volume of the liquid GaP final product. The resultant coil 54 employed comprised 3 ¾ inch inside diameter ¼ inch copper tubing (O.D. = 4 inches) containing 18 turns and having an overall length of about 227 inches.

The gallium 61 was heated by the RF heating coils 54 to a temperature of about 1465°C. Concurrently, the phosphorus 62 was heated by the heating source 56 to a temperature of about 600°C, thereby establishing an ambient within the quartz reaction container 53 comprising (1) phosphorus vapor having a partial pressure of about 590 psi and a remainder of nitrogen, the total pressure equaling the final environment pressure in the autoclave 52 of about 1000 to about 1200 psi.

Figure 3:
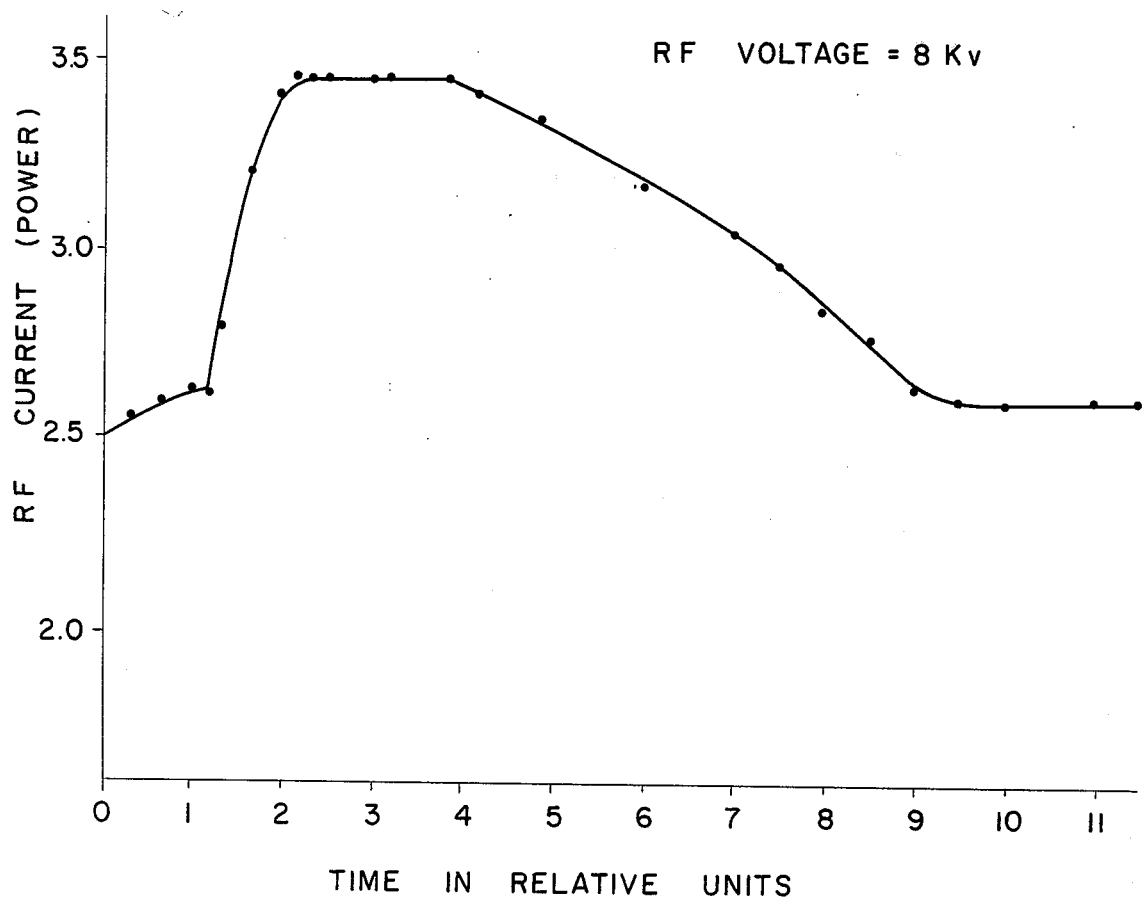
FIG. 3 is a graph plotting the time in relative units of a first reaction between reactants against RF current or power supplied to or flowing through work coils of an induction heater heating one of the reactants.

The phosphorus vapor was reacted with the gallium 61 at a temperature of about 1465°C until the reaction was completed and GaP formed. Completion of the reaction was determined by impressing a constant voltage (RF voltage = 8KV) on the work coil 54 and monitoring the current in the work or heating coil 54 which became constant thereupon as illustrated in FIG. 3.

Upon completion of the reaction, the reaction container conductive was lowered by the lowering means 67 at a rate of about 1 to about 1.6 inches per hour to attain cooling thereof. The lowering was discontinued after about three hours. A 1068 gram GaP ingot was obtained.

EXAMPLE II

Figure 4:
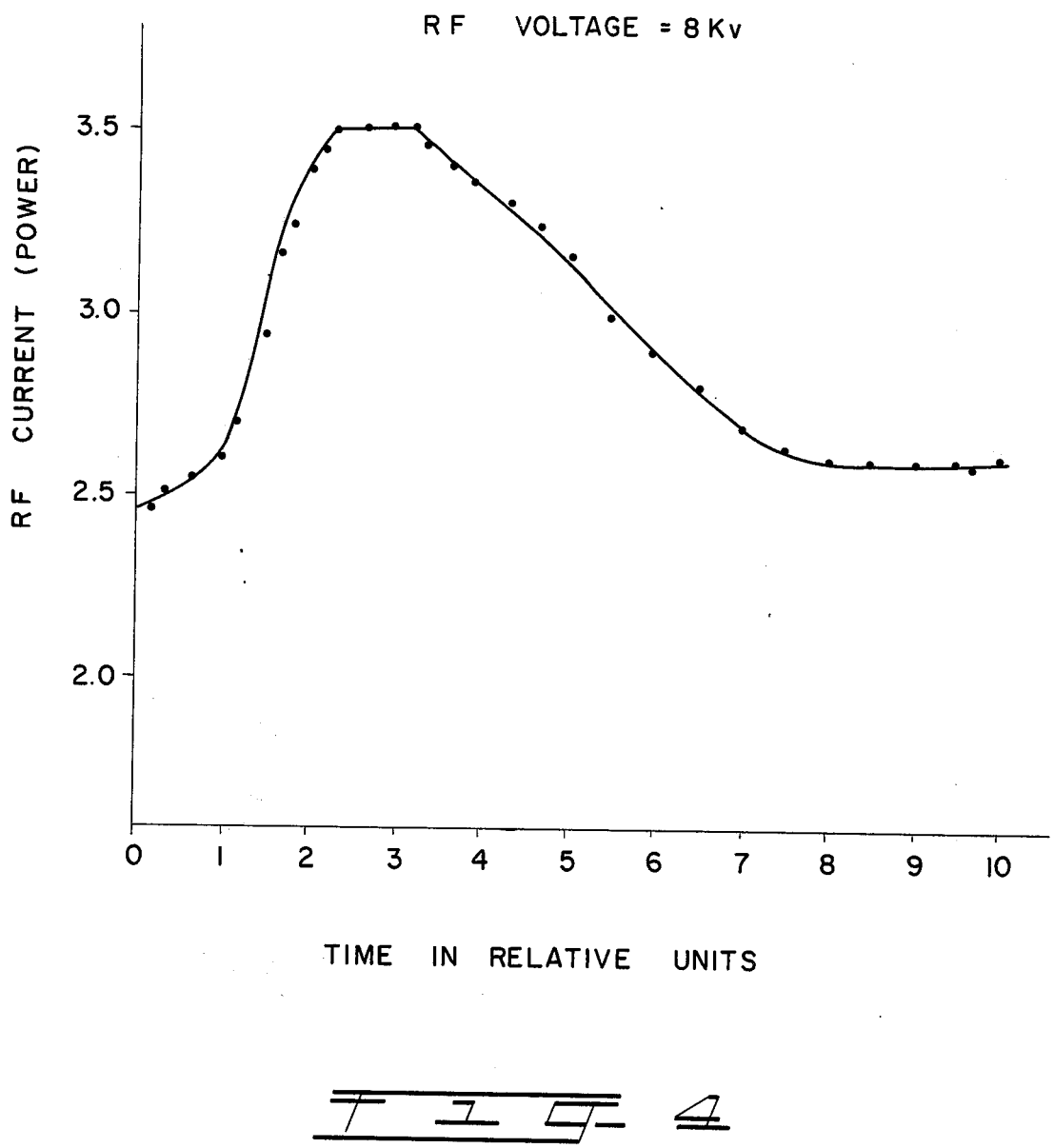
FIG. 4 is a graph having the same coordinates of the graph of FIG. 3 for a second reaction.

The procedure of Example I was repeated and substantially the same results were obtained, as indicated by FIG. 4 which shows a constant current value upon completion of the reaction between the Ga and P. A 1068 gram GaP ingot was obtained.

It is to be understood that the above-described embodiments are simply illustrative of the principles of the invention and that reactants other than Ga and P may be employed to obtain compounds other than GaP, including Group II-VI and Group III-V compounds. Various other modifications and changes may be made by those skilled in the art which will embody the principles of the invention and fall within the spirit and scope thereof.

What is claimed is:

1. A method of reacting a first reactant and a second reactant to form a Group II-VI or a Group III-V compound, comprising:

coupling the first reactant at a reaction site to an induction coil with a first efficiency;
heating the second reactant;
inductively heating the first reactant to react with the second reactant at the site to form a mixture comprising the reaction product and both reactants;
heating said mixture at the site with an efficiency varying from said first efficiency to a second efficiency having a constant value as the reaction proceeds to completion;
monitoring the coupling efficiency during the reaction; and
terminating said heating when said second constant efficiency is attained.

2. The method as defined in claim 1 wherein said reaction product comprises GaP.

3. In an improved method of producing a reaction product comprising a crystalline Group II-VI or Group III-V compound by reacting a quantity of a first reactant, selected from the group consisting of a Group II element or a Group III element, with a second reactant, selected from the group consisting of a Group VI element or a Group V element, comprising:

a. heating the second reactant to a temperature sufficient to produce a vapor ambient thereof; and
b. heating the first reactant to react the first reactant with the vapor ambient to form the Group II-VI or Group III-V reaction product, wherein the improvement comprises:
coupling an inductive heating system to at least one of the reactants to heat the reactant and maximize heating power transfer to the reaction product when the reaction is complete;
monitoring said heating power to determine the absorption thereof; and
cooling the reaction product when the heating power being absorbed becomes constant.

4. The method as defined in claim 3 wherein said first and second reactants comprise Ga and P.

5. A method of producing a crystalline Group II-VI or Group III-V compound, which comprises:

a. placing a quantity of a first electrically conductive reactant selected from the group consisting of a Group II element or a Group III element and a quantity of a second reactant selected from the group consisting of a Group VI or a Group V element within a reaction vessel;
b. coupling an induction heating coil to obtain a relative maximum power transfer to the contents of said vessel upon a complete reaction of said reactants;
c. heating the second reactant to a temperature sufficient to produce within the reaction vessel a vapor ambient thereof;
d. concurrently developing a constant alternating voltage across said coil to produce a current in the first reactant to heat the first reactant to a suitable reaction temperature to react said reactants to form the Group II-VI or III-V compound;
e. monitoring the power absorbed by the contents; and
f. cooling the resultant reaction compound when the power absorbed becomes constant to crystallize the Group II-Group VI or Group III-Group V compound.

6. The method as defined in claim 5 wherein said first reactant comprises Ga and said second reactant comprises P.

\* \* \* \* \*

UNITED STATES PATENT OFFICE
CERTIFICATE OF CORRECTION

Patent No. 3,957,954                    Dated May 18, 1976

Inventor(s) William Andrew Gault

It is certified that error appears in the above-identified patent and that said Letters Patent are hereby corrected as shown below:

Column 2, line 17, "sheel" should read -- shell --;

line 26, "heating" should read -- heater --.

Column 5 lines 46 and 47, "container conductor was" should read -- container 54 was --.

Column 6, line 43, "conduc;tive" should read -- conductive --.

Signed and Sealed this

Seventh Day of September 1976

[SEAL]

Attest:

RUTH C. MASON
Attesting Officer

C. MARSHALL DANN
Commissioner of Patents and Trademarks